Dec. 1, 1953   J. H. HALL   2,661,447
SEALED RECTIFIER
Filed Aug. 16, 1952
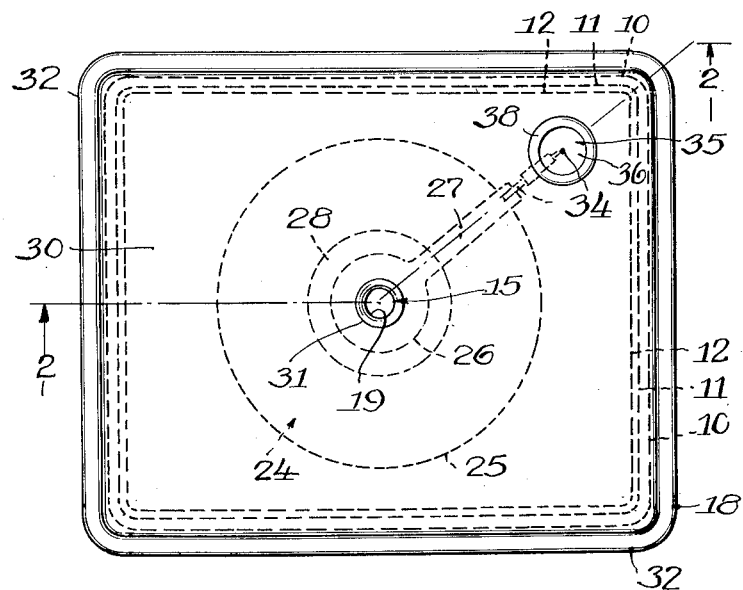
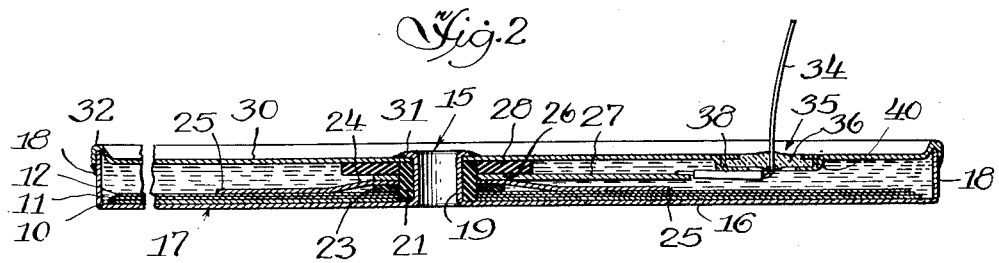
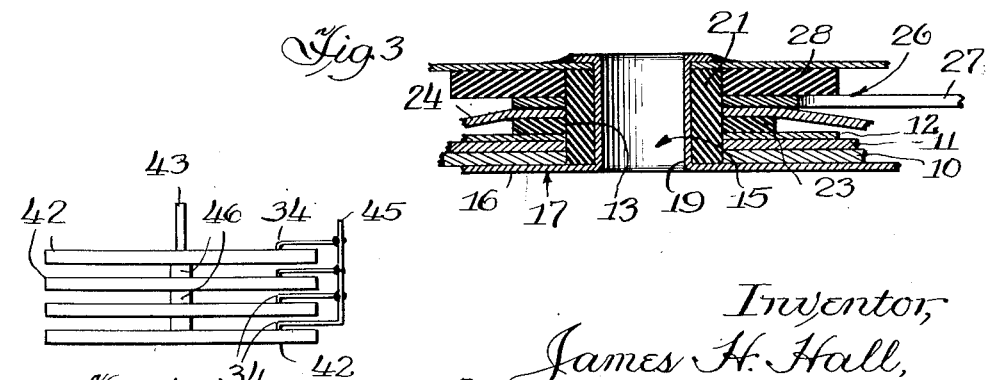
Inventor,
James H. Hall,
By: Schneider & Dressler,
Attys.

Patented Dec. 1, 1953

2,661,447

UNITED STATES PATENT OFFICE 2,661,447

SEALED RECTIFIER

James H. Hall, Lake Bluff, Ill., assignor to Fansteel Metallurgical Corporation, a corporation of New York Application August 16, 1952, Serial No. 304,750

6 Claims. (Cl. 317—234)

This invention relates to a sealed rectifier having a rectifier cell of the barrier layer type, and particularly to selenium or copper oxide rectifiers. This invention relates to a novel construction whereby a rectifier cell is hermetically sealed in a casing and is maintained in a protected atmosphere or medium, while at the same time it is provided with suitable heat dissipating means.

The disposition of various kinds of rectifiers in hermetically sealed casings with or without a heat dissipating liquid, such as oil, is generally old. The construction to be hereinafter described permits a rectifying cell of any desired construction to be handled in a conventional manner as regards connection to outside circuits and to other rectifiers, while at the same time protecting the rectifier against adverse ambient conditions and imparting thereto substantial overload characteristics not present in a simple rectifier cell without any casing.

The invention will now be explained in connection with the drawings wherein a preferred illustrative embodiment thereof is illustrated, it being understood that substantial and various modifications may be made without departing from the spirit of the invention.

Referring therefore to the drawing:

Figure 1 is a plan view of a sealed rectifier embodying the present invention;

Figure 2 is a sectional elevation taken along broken line 2—2 of Figure 1;

Figure 3 is a sectional detail of the central part of the sealed rectifier, illustrating the manner in which the various portions of a rectifier cell are maintained within the casing;

Figure 4 is an elevation of a number of sealed units embodying the present invention, mounted to form a rectifier battery.

The rectifier with which the present invention is concerned may be of the selenium or the copper oxide type, whichever is preferred. Each rectifier unit may be constructed in any one of a number of conventional manners and the rectifier itself may be either of the so-called center connection type or of offset connection type, as desired. For convenience, a preferred form of a selenium rectifier cell will be described with the understanding, however, that the invention is equally applicable to other forms of selenium rectifier cells, to copper oxide rectifiers, and, generally, to rectifier cells of the barrier layer type.

It is well known that a selenium rectifier consists of a carrier electrode of suitable metal, such as iron, for example, upon which is disposed a layer of selenium. The selenium is suitably treated to develop its rectifying properties and includes a blocking layer formed on the surface of the selenium in any one of a number of well-known ways. The entire selenium layer has asymmetric conducting properties. Disposed over the blocking layer is a counterelectrode, usually of a low melting metal or alloy. The terminals of the rectifier are taken at the carrier electrode and counterelectrode, respectively.

A rectifier cell, so far described, is a single unit and generally comes in either disc or plate form. Each such rectifier cell unit generally has an apertured part so that a number of rectifier cell units may be bolted or stacked to form a composite unit.

The present invention may utilize any type of rectifier cell unit of any shape or size. For convenience, however, a plate type of rectifier cell provided with an apertured portion therethrough will be described.

Referring specifically to Figures 2 and 3, a rectifier cell consists of carrier electrode 10 having disposed thereon selenium layer 11 and above that counterelectrode 12. Inasmuch as the manufacture of a selenium rectifier is well known and highly developed, a detailed description will not be given. No attempt is made to show the relative thicknesses of the various layers making a rectifier unit, and no showing is made of the blocking layer existing between the selenium and counterelectrode. The rectifier unit so far described is provided with apertured portion 13. It is understood that the disposition of the apertured portion is not important and the aperture through the rectifier may be at any desired part thereof.

The complete rectifier cell, consisting of carrier electrode 10, selenium layer 11 and counterelectrode 12, forming a unitary construction in itself, is disposed upon bottom 16 of a bottom housing member generally indicated by numeral 17. Housing member 17 is preferably of metal and may be of sheet iron, brass, aluminum, or any other suitable metal. Inasmuch as heat dissipation is one of the important characteristics of the housing, it is preferred to use metal for the entire housing. However, under certain conditions, particularly where a rectifier unit is subject to intermittent short duty periods, part or all of the housing may be of insulating material or molded material. Housing member 17 has upstanding rim 18 at the periphery thereof and upstanding portion 19 substantially centrally thereof. The disposition of upstanding portion 19 is, of course, dictated by the fact that apertured portion 13 of the rectifier cell must register with portion 19.

Upstanding portion 19 is preferably tubular with bore 15 extending through bottom 16. This permits stacking complete units. However, upstanding portion 19 may be solid in part or in whole and block the channel through the housing. Portion 19 is preferably tubular and functions as an eyelet blank.

As shown in Figure 1, a rectifier cell and housing are both generally rectangular in shape having rounded corners. Any other housing and cell shapes may be used.

Eyelet blank portion 19 has a diameter substantially smaller than the apertured portion of the rectifier cell. Disposed around the outside of eyelet portion 19—in this particular instance, the outside of the eyelet occurs inside of the housing—is insulating sleeve 21 of rigid material. Sleeve 21 may be of glass, ceramic, Bakelite, or other solid suitable insulating material capable of withstanding the environment in which the rectifier unit operates, and of functioning as a compression sleeve. The length of insulating sleeve 21 axially of eyelet portion 19 is substantially equal to the depth of the housing. The rectifier cell is disposed so that carrier electrode 10 rests upon and contacts housing bottom 16 with insulating sleeve 21 within apertured portion 13 of the rectifier cell.

In the usual construction of a rectifier cell, the selenium and counterelectrode material, in some instances, is not present over all of the carrier electrode 10, but instead is absent from marginal or edge portions as in the immediate neighborhood of apertured portion 13. Hence, if electrical contact is to be established with the counterelectrode, it is generally desirable to establish this contact at a region or regions of the counterelectrode removed from inside or outside marginal portions. To this end, insulating washer 23 is provided outside of insulating sleeve 21 and immediately above counterelectrode 12. Such a washer is usually of rigid material capable of withstanding substantial compression. The material of which washer 23 is made may generally be the same as insulating sleeve 21. The thickness of insulating washer 23 is not important and the width of the washer is just sufficient so that a narrow annular region is covered. Disposed over washer 23 is dished pressure plate 24 of metal having good electrical conductivity. Such a metal may be iron, spring copper, brass, Phosphor bronze or the like. Pressure plate 24 has marginal portion 25 in firm contact with at least part of counterelectrode 12. Inasmuch as the reverse current characteristics of a rectifier are affected to a substantial degree by the pressure exerted upon the blocking layer, it is of importance that the pressure plate exert a substantially uniform pressure upon the rectifier cell at all times throughout the operating life of the cell. Furthermore, it is desirable that the construction be such that the pressure of a pressure plate upon a cell will be substantially the same from cell to cell in quantity production.

Resting on top of the inner portion of pressure plate 24 is terminal member 26. Terminal member 26 may be of copper or brass and may be of conventional construction having an apertured body part, as shown, disposed around insulating sleeve 21 and tail piece 27 to which a wire or conductor may be soldered in the usual fashion. Disposed above terminal member 26 is end washer 23 of insulating material. End washer 28 is also of rigid insulating material and may be generally of the same material as insulating tube 21 or insulating washer 23.

As is clearly apparent in Figures 2 and 3, the various insulating washers, terminal member, pressure plate and rectifier cell are aligned around insulating sleeve 21. It will thus be seen that eyelet portion 19 of the housing is electrically insulated from the selenium layer, the counterelectrode, the metal pressure plate and terminal member.

Housing 17 is provided with cover 30 preferably of the same material as the housing. Cover 30 is apertured so that eyelet portion 19 extends through the cover portion, the edge of the eyelet portion thereafter being flattened over in the usual fashion. Annular portion 31, where the bent over edge of the eyelet rests against the top surface of cover 30, may be soldered to provide a hermetic seal for this portion of the casing. In the event that cover portion 30 is of an insulating material, then suitable gaskets may be disposed around the eyelet portion prior to the edge being bent over to provide a seal.

Housing cover 30 has marginal portion 32 shaped to form a generally U-shaped section for overlying edge 18 of the housing. It is desired to have a snug fit between the edge of the cover and side 18 of the housing so that a hermetic seal around the edge of the cover may be provided. Such a hermetic seal may be provided by soldering the overlying edge of the cover to the side of the housing, or the metal may be crimped, as is customary in canning operations.

The carrier electrode of the rectifier cell is in direct metallic contact with the inside surface of the bottom 16 of the housing. If desired, the two opposing metal surfaces may be soldered, assuming that the housing is of metal. It will be apparent, therefore, that the rectifier cell is grounded to the housing. The other terminal of the sealed rectifier cell is formed by wire 34 soldered or otherwise attached to tail piece 27 of the terminal member. Wire 34 is carried by insert 35 forming a prefabricated hermetic seal. Such prefabricated seals are readily available and consist of insulating disc or washer 36 in which wire 34 is sealed. As an example, wire 34 may be a solid, bare copper wire passing through disc 36 of glass. Insulating disc 36 is provided with metal rim 38 hermetically sealed to the insulating disc. As a rule, metal rim 38 is of copper or iron and permits of the hermetic mounting of the seal insert in the cover. The entire seal unit is seated in a dished apertured portion 40 of cover 30, the metal rim 38 and the adjoining metal of the cover portion being soldered together to provide a hermetic seal and mechanical mounting.

The interior of the sealed housing is filled with a suitable medium such as an insulating liquid. This liquid may be disposed within the housing prior to the application of the seal to the cover or, if desired, a filling aperture may be provided in cover 30 for the introduction of a liquid, after which the filling aperture may be closed by a glob of solder. The liquid for use within the housing may be transformer oil or may be any other desired liquid which will insure a long operating life to the rectifier cell. So long as the liquid has substantial insulating properties, the nature thereof may be governed by the requirements of the rectifier cell. A thin insulating liquid will provide for rapid dissipation of heat, since liquid convection currents may be readily established. Due to the extended surface of the housing and the fact that the housing wall is thin and may bend either inwardly or outwardly, it will ordinarily not be necessary to allow for any substantial air space within the housing to accommodate for expansion of liquid incident to a rise in temperature.

The intimate contact between the liquid and rectifier cell will permit the cell to operate at substantial overloads for short periods of time. Until the temperature of the liquid body within the housing and the housing itself is elevated to a predetermined safe value, there will be no problem incident to dissipation of heat. It is apparent that a rectifier cell is disposed in intimate contact with a system having substantial thermal lag. Once the housing has reached an elevated temperature, then dissipation of heat from the housing surface will be necessary.

If desired, a solid thermoplastic insulating filler may be used in the housing instead of a liquid.

The housing may be disposed in a blast of air, or may be disposed in a suitable insulating liquid itself, or may be handled in any desired manner.

Referring to Figure 4, a number of units 42 consisting of a complete housing enclosing a rectifier cell may be secured upon rod 43 of either insulating or conducting material. If units 42 are to be connected in parallel, leads 34 will be connected to a common terminal 45 while eyelet portion 19 of the various units will make good contact with metal post 43.

It is preferred to have individual units 42 spaced from each other by washers 46 so that adequate dissipation of heat between adjacent housing walls will be possible. It will be noted that by virtue of the construction of eyelet portion 19 and the insulating components of the housing, particularly insulating sleeve 21, the pressure upon individual rectifier cells will be unaffected by the clamping pressure of the various units on bolt or post 43, unless, of course, extreme pressure, tending to deform insulating sleeve 21, is generated. Within wide limits, however, the back pressure incident to assembling a number of units, as shown in Figure 4, will have no appreciable effect upon the pressure exerted upon the individual rectifier cells.

If it is desired to connect the individual units in series, then it will be necessary to insulate eyelet portion 19 of one unit from the corresponding eyelet portion or eyelet part of another unit. This may be accomplished by using an insulating sleeve around a metal post or by using an insulating post.

It is apparent that a rectifier cell, housed in a manner disclosed, may be assembled as easily and as conveniently as a simple rectifier cell and, in many instances, may be handled with far greater ease and convenience. Where rectifier cells are to be used in atmospheres which may be injurious or detrimental to the life of a rectifier cell, the housing will render the cell substantially independent of the medium in which the unit as a whole is to operate. In particular, such units may be used in tropical regions or under conditions where high humidity or corrosive conditions obtain.

What is claimed is:

1. A sealed rectifier assembly comprising a flat tray-like metal member having upstanding sides and having a portion extending upwardly from the bottom of said member, a compression sleeve around said upstanding portion, a rectifier cell lying in said tray-like member with said upstanding portion and compression sleeve passing through an apertured cell portion, said cell including flat carrier electrode and counterelectrode between which there is disposed an asymmetrically conducting layer, an apertured metal cover for said flat tray-like member, said cover and tray-like member together forming a housing and having the edges interfitting for providing a sealed junction, the upstanding portion passing through the cover aperture and sealed to said cover to form a tight metallic and permanent connection, said housing having an insulating liquid within the same and having means for establishing electrical connections from the cell electrodes to the exterior of the housing.

2. The construction according to claim 1 wherein the means for connecting the cell electrodes include physical contact between one of the cell electrodes and the housing to ground the cell to the housing and wherein an insulating lead in construction forms part of the housing, said lead-in being connected to the other terminal of said cell.

3. A sealed rectifier assembly comprising a bottom metal member having a flat portion with upstanding sides and having a tubular portion extending upwardly from the bottom of said member, a compression sleeve of insulating material around said tubular member, a rectifier cell lying in said bottom housing member with said tubular portion and compression sleeve passing through an apertured cell portion, said cell including flat carrier and counterelectrodes between which there is disposed an asymmetrically conducting layer, said compression sleeve being longer than the maximum thickness of the rectifier cell, a metal cover for said bottom portion and adapted to be sealed thereto at the edges, said cover having an aperture through which the upwardly extending tubular portion passes, the free end of said tubular portion being bent over said cover to lock the same in place, said compression sleeve taking the compression incident to locking the two parts of the housing at said upstanding portion, said housing having an insulating liquid within the same for transferring heat developed in said rectifier to the walls of the housing, said rectifier cell being grounded to the housing by having one electrode contacting the housing and means passing through the housing, and insulated therefrom, for establishing an external connection to the other electrode of said cell.

4. A sealed rectifier assembly comprising a flat bottom housing member having upstanding sides and having a tubular portion extending upwardly from the bottom of said member at an intermediate portion thereof, said tubular member comprising an eyelet blank and having a bore through the full length of said tubular member, a compression sleeve around said tubular portion, a rectifier cell lying in said member with said tubular portion and sleeve passing through an apertured cell portion, said cell including flat carrier and counterelectrodes between which there is disposed asymmetrically-conducting layer material, an apertured cover for said housing member, the cover aperture registering with the tubular portion and the tubular portion extending through said cover, said cover having a part overlying the rim of said housing member, said cover and bottom housing member being permanently joined at the rim to form a hermetically sealed housing, said protruding tubular portion being bent over to form an eyelet joining the two parts of said housing, said compression sleeve being longer than the maximum thickness of said rectifier cell so that the entire force incident to eyeletting is assumed by the compression sleeve, said housing containing an insulating liquid and means forming part of the housing for providing external connections to the two cell electrodes.

5. The construction according to claim 4 wherein the bottom housing member is of metal with the rectifier cell having one electrode in intimate contact with said metal bottom housing member to ground the cell thereto, an insulating washer around said insulating sleeve and lying over the free side of the cell, a metal pressure plate of spring material disposed around said insulating sleeve and above insulating washer, said pressure plate having a marginal portion thereof spring-pressed against the other electrode of said cell to contact the same, a conducting lead electrically connected to said pressure plate and means for hermetically and insulatingly sealing said conducting lead so that the same may pass through the housing wall for external circuit connection.

6. A sealed rectifier assembly having a generally flat metal tray-like member having upstanding sides and having an upstanding tubular eyelet blank, the bore of said eyelet blank extending through the bottom of said tray-like member, a compression sleeve around said eyelet blank, a rectifier cell lying in said tray-like member with said eyelet blank and sleeve passing through an apertured cell portion, said cell including flat carrier and counterelectrodes between which there is disposed an asymmetrically conducting layer, a metal cover for said tray-like member, said cover having a marginal portion thereof sealed to the sides of said tray-like member to form a housing, said eyelet blank passing through an aperture in said cover and being turned over and soldered to said cover for hermetic sealing, said cell lying on the tray-like member with one of its electrodes in electrical contact therewith, a dished compression plate of spring metal disposed around said insulating sleeve and having a marginal portion resting upon the other electrode of said cell, insulating washers above and below said dished pressure plate to insulate the inner portion of said pressure plate from both the cover and adjacent part of the rectifier cell, the marginal portion of said dished pressure plate being bent away from the cover toward the other electrode of said cell and contacting the same, a lead electrically connected to said pressure plate, means for hermetically and insulatingly mounting said lead in said cover plate so that the lead passes through the cover plate, said compression sleeve taking the force of compression exerted axially of the eyelet after the same has been turned over and an insulating liquid within said housing, said assembly as a whole being susceptible to stacking on a post passing through eyelet without substantial effect upon the compressive force exerted upon the rectifier cell.

JAMES H. HALL.

References Cited in the file of this patent
UNITED STATES PATENTS

| Number | Name | Date |
|---|---|---|
| 1,649,742 | Ruben | Nov. 15, 1927 |
| 2,430,351 | Lidow et al. | Nov. 4, 1947 |
| 2,430,904 | Boldingh | Nov. 18, 1947 |